June 30, 1964 P. W. SENFLEBEN 3,139,012
APPARATUS FOR FORMING CONTAINERS
Filed July 12, 1962 2 Sheets-Sheet 1

Inventor
Paul W. Senfleben
By his Attorney
Richard G. Wise

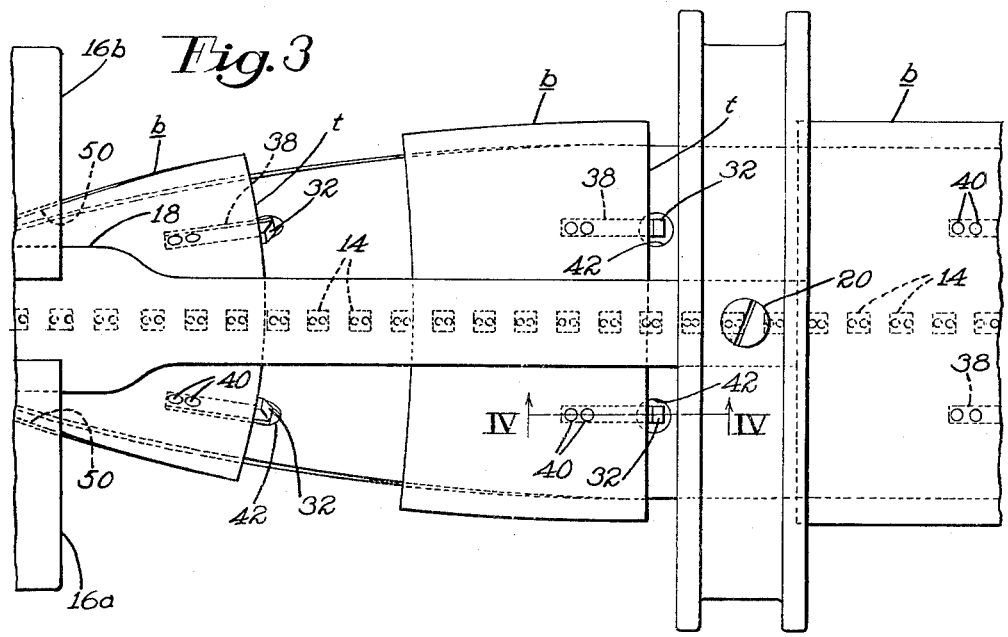
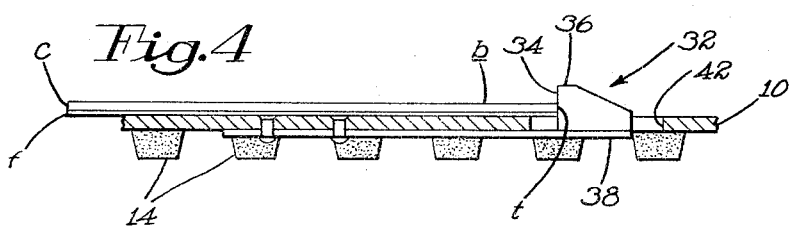
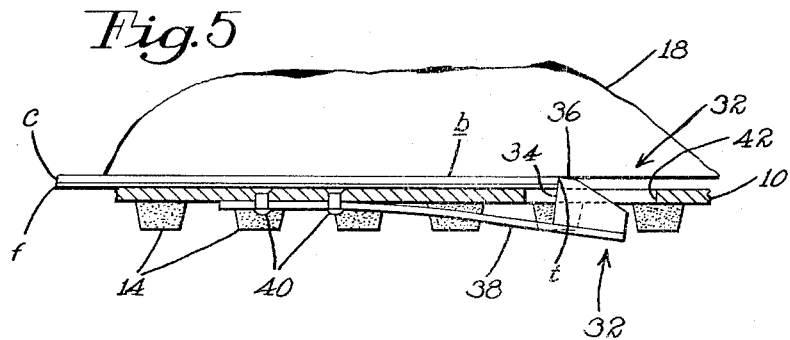

United States Patent Office 3,139,012
Patented June 30, 1964

3,139,012
APPARATUS FOR FORMING CONTAINERS
Paul W. Senfleben, Beverly, Mass., assignor, by mesne assignments, to United Shoe Machinery Corporation, Boston, Mass., a corporation of New Jersey
Filed July 12, 1962, Ser. No. 209,473
6 Claims. (Cl. 93—82)

This invention relates to machinery for forming containers and more particularly to a machine for forming container bodies from pieces of flexible sheet material which, in a continuous process, are bent into tubes with two parallel edge portions of each sheet overlapped and secured to form a longitudinal side seam.

United States Patent No. 2,915,952 issued December 8, 1959 to J. G. O'Neil discloses a machine for making tubular container bodies from flat flexible blanks. The machine employs a relatively long, container-forming mandrel and a movable endless flexible belt. Rectangular blanks are fed onto the moving belt which is caused to travel lengthwise of the mandrel and rollers, positioned adjacent the mandrel, deflect the belt and the container blanks around the mandrel. Near the terminal end of the machine is located side seam forming mechanism comprising apparatus for causing two parallel marginal edges of the blank to be assembled in overlapping relationship and adhesively joined.

It is essential that the leading and trailing edges of the blanks, i.e. those that form the open ends of the tubes, be carried by the belt normal to the axis of the mandrel. This is to assure that when the parallel sides are overlapped their ends are in accurate registration lengthwise of the tube whereby the open ends of the seamed tube each comprises a smooth, continuous, uninterrupted line ready for the reception of an end closure and whereby the diameter of the tube is uniform throughout its length.

To obtain proper alignment and orientation of the blanks, as well as to provide means for assuring continuous movement of the container blanks, a plurality of sheet-engaging lugs are located on the mandrel-engaging surface of the belt. The lugs are oriented on the belt in pairs positioned as two rows extending throughout the entire length of the belt. The pairs of lugs are spaced a predetermined distance apart, the distance being slightly greater than the end-to-end length of the blanks.

Rectangular blanks or sheets of flexible material are fed to the belt one at a time in a continuous manner and as seach sheet reaches the belt its trailing edge is engaged by one pair of lugs, aligned and moved forwardly as the belt begins to wrap about the mandrel. Because the lugs are located on the mandrel-engaging surface of the belt it is necessary to provide longitudinal slots in the mandrel to accommodate the lugs when the belt and the sheets are carried thereon are deflected into engagement with the mandrel.

While this apparatus has proven to be satisfactory, the slots in the mandrel naturally provide interruptions in its container forming surface. It is obviously more desirable to have the entire container forming surface of the mandrel smooth and continuous to prevent the formation of "flats" or ridges lengthwise of the container bodies. "Flats" are inclined to occur if thin, unresilient sheet material is used for body stock. There would be less likelihood of formation of "flats" or ridges on the containers if the slots were located on the belt deflecting means, i.e. the rollers as disclosed by O'Neil, since the sheets would engage a continuous surface on the mandrel and would be separated from the slots by the belt.

It is an object of this invention to provide a machine for forming tubular container bodies from flexible sheets having a mandrel and an endless belt provided with lugs for engaging and orienting the sheets on the belt and wrapping them progressively about the mandrel wherein the sheet engaging surface of the mandrel is continuous and uninterrupted.

It is another object of this invention to provide a machine of the type described wherein the sheet engaging lugs are yieldable relatively to the mandrel thereby eliminating the need for providing slots in the mandrel.

Still another object of this invention is to provide a machine of the type described having a mandrel about which container bodies are formed which is less expensive and more easily constructed.

In accordance with these objects and as a feature of this invention there is provided in a machine of the type described for making tubular articles, such as container bodies, which has an endless flexible belt for engaging and advancing sheets of flexible material lengthwise of a stationary mandrel and means for progressively deflecting the belt and sheets supported thereon into substantial surface area contact with the mandrel; means for engaging and moving the sheets lengthwise of the mandrel comprising lugs on the belt which are engageable with the trailing edge of the sheets, said lugs being resiliently mounted for movement through holes in the belt so that when the belt is wrapped about the mandrel the lugs are urged outwardly by the mandrel without becoming disengaged from the sheets being moved. The lugs are mounted at the ends of cantilever springs secured to the side of the belt opposite the side which engages the mandrel. Normally the springs cause the lugs to project through intersecting holes in that surface of the belt that faces the mandrel and hence are urged into sheet-engaging position. Engagement with the mandrel causes the lugs to be urged in the opposite direction through the belt without becoming disengaged from the sheets. The belt deflecting means are provided with one or more grooves extending lengthwise of the mandrel to accommodate the lugs as they are urged outwardly of the mandrel.

The above and other features of the invention including various novel details of construction and combinations of parts will now be more particularly described with reference to the accompanying drawings and pointed out in the claims. It will be understood that the particular machine embodying the invention is shown by way of illustration only and not as a limitation of the invention. The principles and features of this invention may be employed in varied and numerous embodiments without departing from the scope of the invention.

In the drawings,

FIG. 3 is a plan view on enlarged scale of a portion of the machine viewed in the direction of the line III on FIG. 1;

FIG. 4 is a sectional view on enlarged scale taken along the line IV—IV of FIG. 3 and illustrating a sheet engaging lug; and, FIG. 5 is a view similar to FIG. 4 showing the sheet engaging lug after the belt and sheet have been wrapped about the container-forming mandrel of the illustrative machine.

Figure 1:
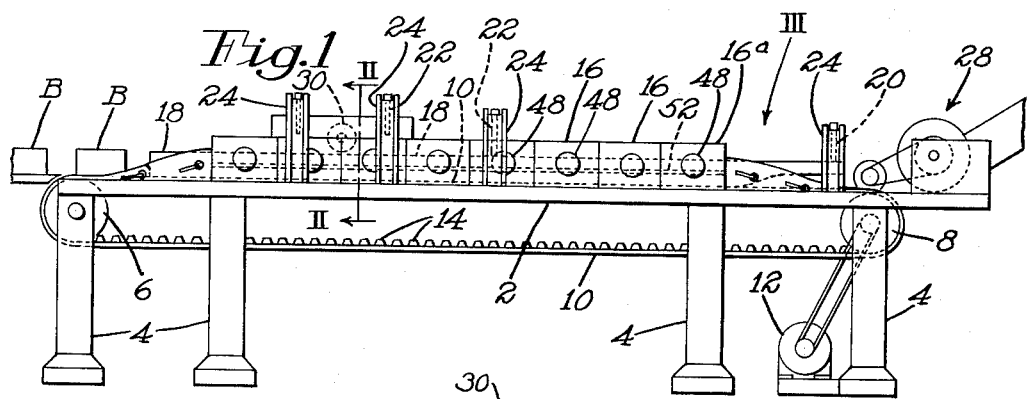
FIG. 1 is a side elevation of a machine embodying the invention.

FIG. 1 illustrates only broadly the elements of a machine which embodies the invention and is basically similar to the above-identified O'Neil machine. An elongated main frame 2 is supported on legs 4 and at the opposite ends of the frame are located drums 6 and 8 about which passes an endless flexible container forming belt 10. The drum 8 is driven in a counterclockwise direction by a motor 12 and includes a sprocket wheel (not shown) which engages driving lugs 14 on the belt 10. The belt passes through a series of forming shoes 16 which are the equivalents of the O'Neil belt deflecting rollers. The shoes 16 cause the flexible belt to be wrapped progressively about an elongated mandrel 18 mounted horizontally above the belt by supporting brackets 20 and 22 each suspended from one of a number of inverted U-shaped frame members 24 positioned lengthwise of the machine.

Rectangular blanks $b$ of flexible sheet material, herein illustrated as a lamination of chip board $c$ and foil $f$ (FIG. 2) are fed onto the belt 10 by a feeder 28 which is similar to the O'Neil feeder. Also as in the O'Neil machine, a pressure roll 30 is employed for pressing the overlapped, parallel marginal portions of the blanks $b$ together against the mandrel 18 to seal the side seam. While the machine is illustrated only generally in FIGS. 1 and 2 it is, as thus far described, in all respects the equivalent of the O'Neil machine although differing in minor details of construction.

As the blanks $b$ are fed one by one from the feeder 28 onto the belt 10, the trailing edge $t$ (FIG. 3) of each blank is engaged by lugs 32 to align the edges normal to the axis of the mandrel 18 and to move the blanks lengthwise of the mandrel as they are progressively wrapped therearound.

Referring more particularly to FIGS. 4 and 5, each lug 32 has a blank-engaging surface 34 and a mandrel engaging surface 36. The lug is mounted at the end of a cantilever spring 38 secured by rivets 40 to the side of the belt opposite to the side which engages the blank $b$, i.e., the same side of the belt to which the driving lugs 14 are attached. The lugs 32 project through holes 42 in the belt 10 whereby a portion of their blank-engaging surfaces 34 are in position to engage the trailing edges $t$ of each blank $b$.

Each shoe 16 comprises a block having a substantially semicylindrical inner surface 44 (FIG. 2) of slightly greater diameter than the diameter of the mandrel 18, the differences in diameter being substantially equal to twice the sum of the thickness of the belt 10 and the thickness of the blank $b$. Two shoes form a pair on opposite sides of the mandrel and although not an essential feature of this invention, are adjustable relatively thereto along guideways 46 in the frame 2, adjusting wheels 48 being provided for this purpose.

The first pair of shoes 16a and 16b (FIG. 3) have tapered interior surfaces 50 gradually leading to the semicylindrical surface 44 of the next succeeding pair of shoes thereby to induce the belt gradually into mandrel wrapping position.

Figure 2:
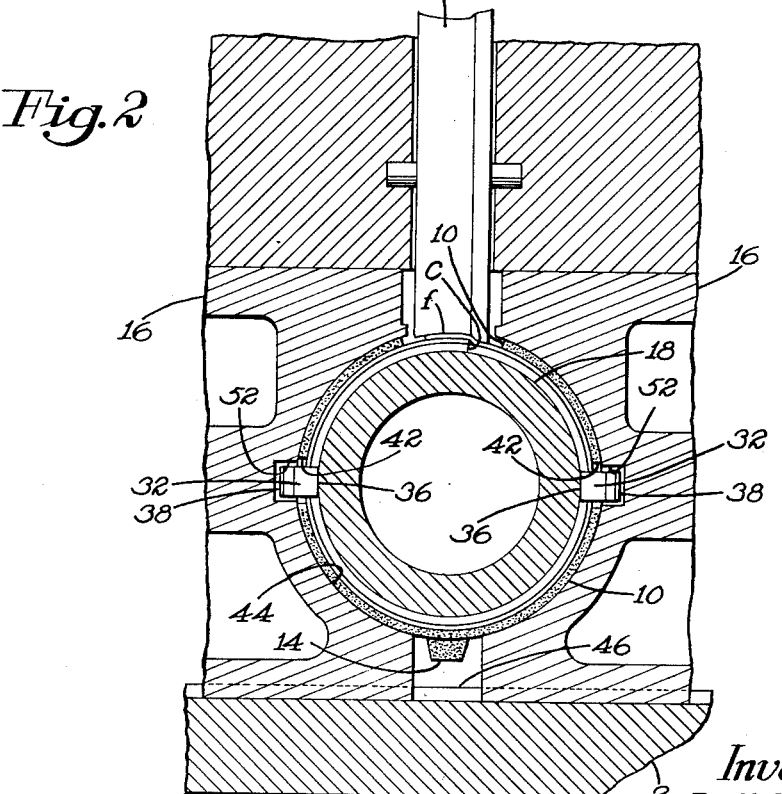
FIG. 2 is a sectional view on enlarged scale taken along the line II—II of FIG. 1.

As the belt and the blanks $b$ carried thereon become wrapped about the mandrel 18, gradually asuming the configuration shown in FIG. 2, the mandrel engaging surface 36 of each lug 32 comes in contact with the surface of the mandrel whereupon the lug is urged outwardly through the hole 42 in the belt assuming the position shown in FIG. 5. After being forced outwardly of the holes 42, the upper portion of the blank-engaging surface 34 remains in engagement with the trailing edge $t$ of the blank.

Longitudinal slots 52 are formed in the shoes parallel with the mandrel to accomodate the outwardly moved lugs 32. It will be obvious to one skilled in the art that if the machine is equipped with the bell shaped rollers of O'Neil rather than the shoe 16, which are their equivalents, each roll would be provided with an annular groove to accommodate the lugs.

As each blank $b$ nears the terminal end of the forming shoes, its opposite parallel edges are overlapped and form into a side seam which is compressed by the roller 30 in known manner as shown in FIG. 2. Thereupon the belt 10 leaves the last pair of forming shoes and gradually assumes a flattened positioned as the then completed tubular bodies B leave the left-hand or terminal end of the mandrel 18. Upon the belt moving away from the mandrel the inherent resiliency of the cantilever springs 38 mounting the lugs causes the lugs to move in the opposite direction through the holes 42 and into their original positions whereupon they are ready to engage another blank $b$ and repeat the cycle after they have traveled around the drums 6 and 8, respectively.

Having thus described my invention, what I claim as new and desire to secure by Letters Patent of the United States is:

1. A machine for making tubular articles having, in combination, a belt adapted to carry a sheet of article forming material, a mandrel, means for moving the belt lengthwise of the mandrel, members on the belt for engaging and moving the sheet, means for wrapping the belt and sheet about the mandrel during movement, and resilient means mounting said members on the belt to project toward and engage the mandrel when the belt is wrapped about it, whereby when said members engage the mandrel they are urged outwardly thereof as the belt is wrapped about it.

2. A machine for making tubular articles having, in combination, a belt adapted to carry a sheet of article forming material, a mandrel, means for moving the belt lengthwise of the mandrel, members on the belt for engaging and moving the sheet, means for wrapping the belt and sheet about the mandrel during movement, resilient means mounting said members on the belt to project toward and engage the mandrel, whereby when said members engage the mandrel they are urged outwardly thereof as the belt is wrapped about it, and means associated with said wrapping means to accommodate the sheet moving members which have been urged outwardly of the mandrel.

3. In a machine for making tubular articles comprising an endless flexible belt for advancing sheets of flexible material lengthwise of a stationary mandrel, means for moving the sheets lengthwise of the mandrel comprising lugs engageable with the trailing edges of the sheets, said belt having holes to accommodate the lugs, means for progressively deflecting the belt and sheets supported thereon into substantial surface area contact with the mandrel, and spring means secured to the side of the belt opposite the side which engages the mandrel, said lugs being mounted on the springs and projecting through the holes in the belt whereby when the belt is wrapped about the mandrel the lugs are urged outwardly by the mandrel while retaining contact with the sheets.

4. In a machine for making tubular articles comprising an endless flexible belt for advancing sheets of flexible material lengthwise of a stationary mandrel, means for moving the sheets lengthwise of the mandrel comprising lugs on the belt engageable with the trailing edges of the sheets, said belt having holes to accommodate the lugs, means for progressively deflecting the belt and sheets supported thereon into substantial surface area contact with the mandrel, and cantilever springs secured to the side of the belt opposite the side which engages the surface of the mandrel, said lugs being mounted on the free ends of the cantilever springs and projecting through the holes to be engageable with the sheets and the mandrel whereby when the belt is wrapped about the mandrel the lugs are urged outwardly by the mandrel while retaining contact with the sheets.

5. In a machine for making tubular articles comprising an endless flexible belt for advancing sheets of flexible material lengthwise of a stationary mandrel, means for moving the sheets lengthwise of the mandrel comprising lugs engageable with the trailing edges of the sheets, said belt having holes to accommodate the lugs, means for progressively deflecting the belt and sheets supported thereon into substantial surface area contact with the mandrel, and resilient means mounting the lugs on the belt for urging the lugs through the holes to project yieldingly from the surface of the belt which engages the mandrel whereby when the belt is wrapped about the mandrel the lugs engage the mandrel and are urged outwardly thereof while retaining contact with the sheets, the deflecting means having a recess formed lengthwise of the mandrel to accommodate the lugs when they are urged outwardly.

6. A machine for forming tubular articles comprising a stationary mandrel, a movable belt adapted to carry a plurality of article producing sheets of flexible material, means for deflecting the belt and the sheets about the mandrel and holding the sheets and the belt closely thereagainst to form the sheets into tubes, lugs for engaging and moving the sheets lengthwise of the mandrel, said belt having holes to accommodate the lugs, and resilient means mounting the lugs in said holes for yielding projection from the surface of the belt which engages the mandrel, whereby when the belt is wrapped about the mandrel the lugs engage the mandrel and are urged outwardly thereof while retaining contact with the sheets.

References Cited in the file of this patent

UNITED STATES PATENTS

| | | |
|---|---|---|
| 495,426 | Murch et al. | Apr. 11, 1893 |
| 1,303,278 | Field | May 13, 1919 |
| 2,429,536 | Von Sydow | Oct. 21, 1947 |
| 2,915,952 | O'Neil | Dec. 8, 1959 |